United States Patent Office

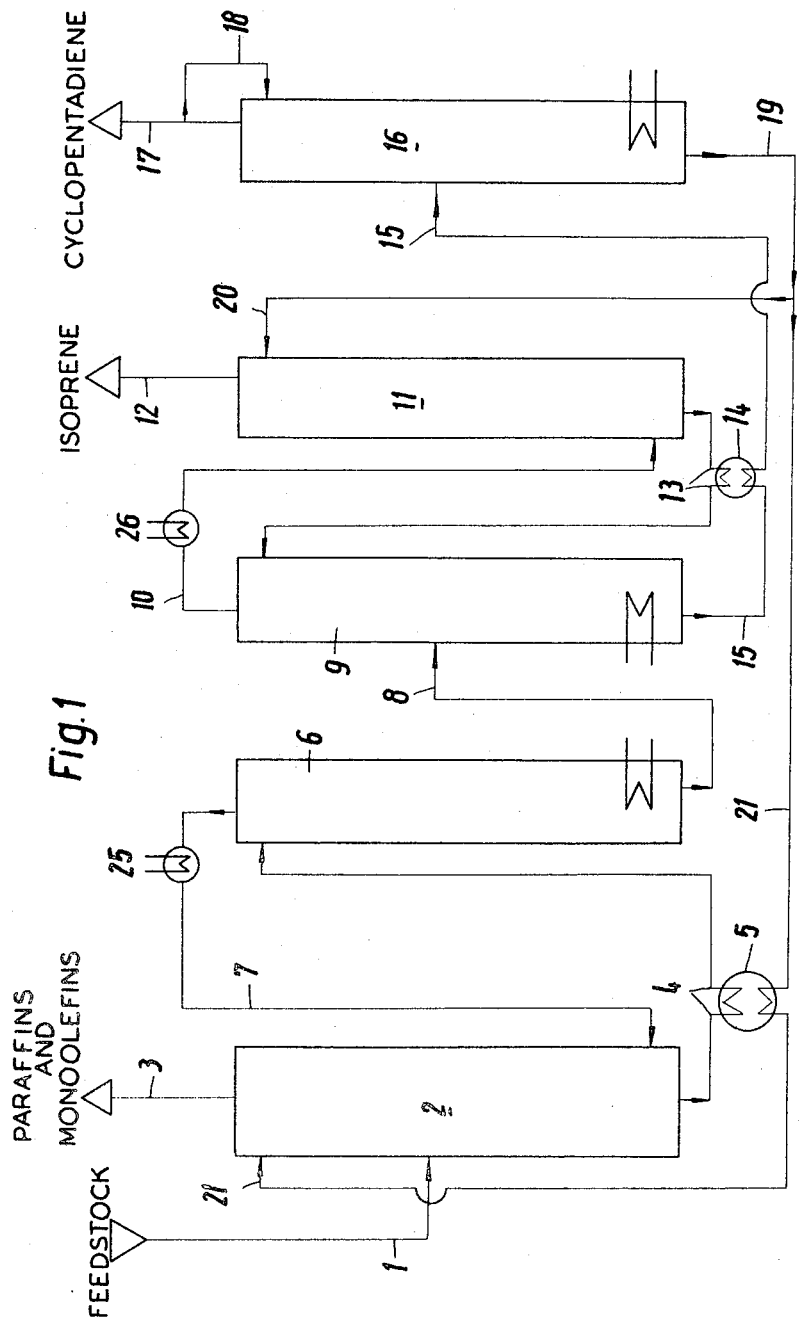

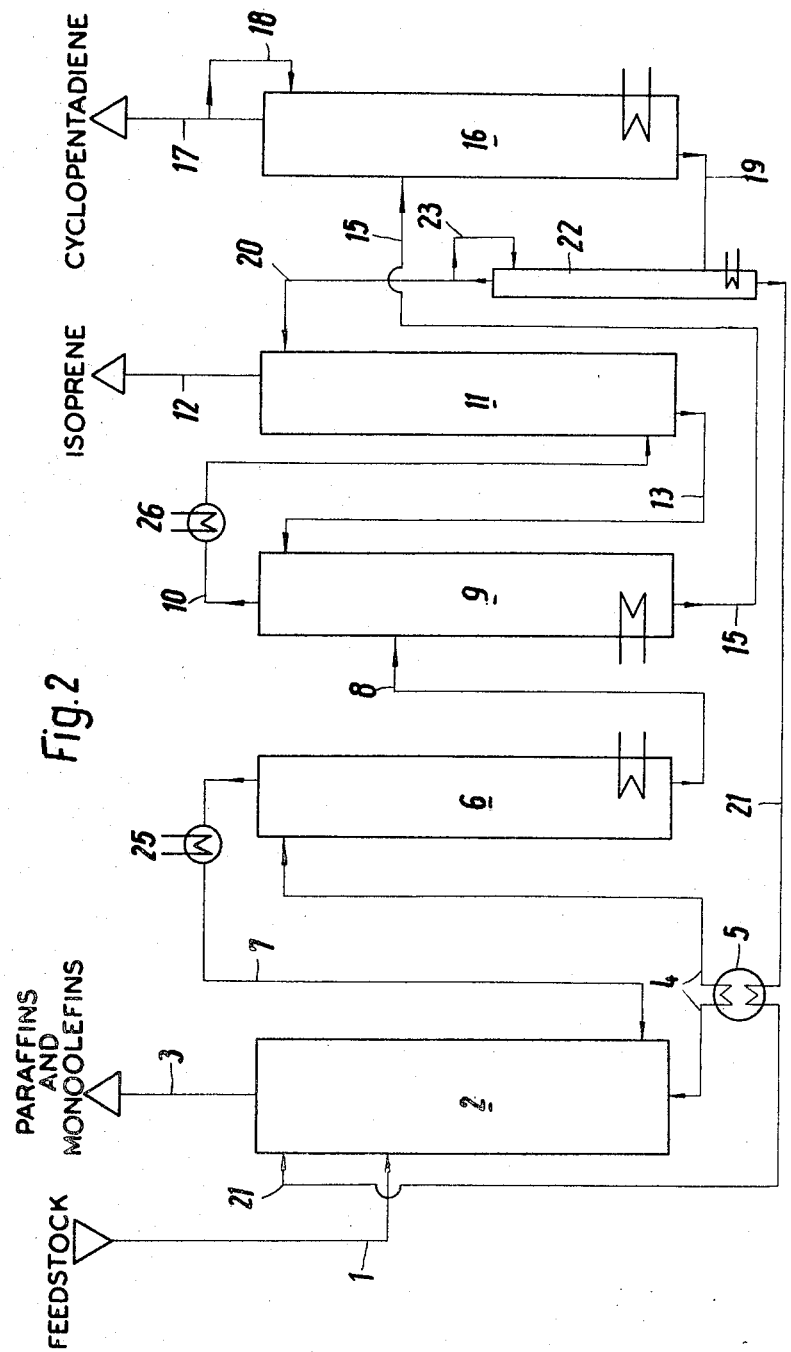

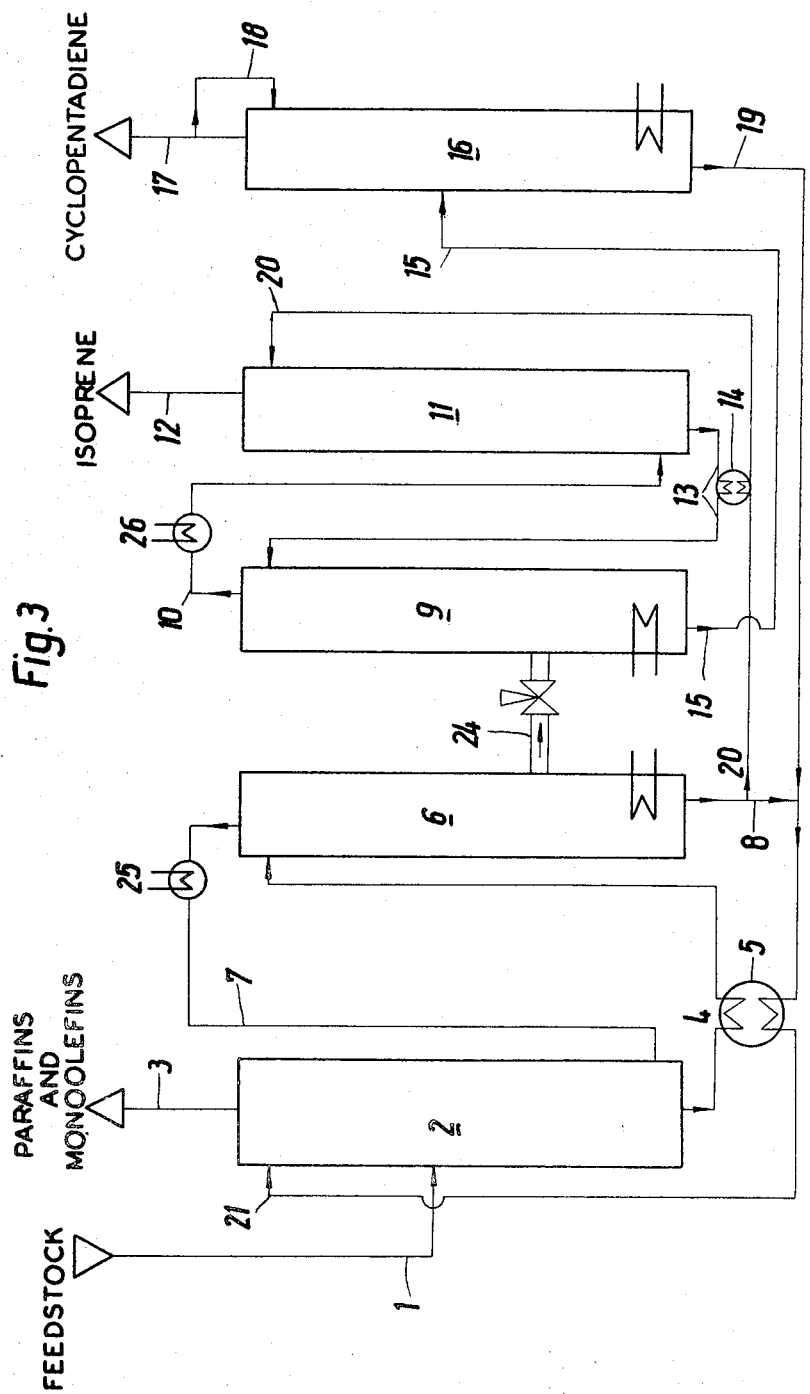

3,707,575
Patented Dec. 26, 1972

3,707,575
PROCESS FOR SEPARATING C₅ HYDROCARBONS BY SOLVENT EXTRACTION AND EXTRACTIVE DISTILLATION
Eckart Muller, Bergen Enkheim, Karl Heinz Eisenlohr, Buchschlag, and Helmut Klein, Hanau, Germany, assignors to Metallgesellschaft Aktiengesellschaft
Filed Aug. 11, 1970, Ser. No. 63,151
Claims priority, application Germany, Aug. 13, 1969, P 19 41 197.3
Int. Cl. C07c 7/00
U.S. Cl. 260—666 A                    14 Claims

ABSTRACT OF THE DISCLOSURE

A $C_5$ hydrocarbon mixture is separated by removing monoolefins and paraffins from the mixture by solvent extraction followed by extractive distillation. The bottoms product (distilland) from the distillation step is then extractively distilled a second time and a mixture of isoprene and co-distilled cyclopentadiene is obtained as the distillate which is subject to a second solvent extraction to remove the cyclopentadiene. The bottoms product from the second distillation step is further distilled to recover cyclopentadiene as the distillate and solvent which is recycled to the first and second solvent extraction steps.

BACKGROUND

This invention relates to process and apparatus for separating a mixture of hydrocarbons and in particular for separating the $C_5$ fraction obtained from pyrolytic gasoline especially to recover isoprene and cyclopentadiene.

The production of gaseous olefins by a thermal cracking of liquid hydrocarbons involves the formation of a primary cracked product, which also includes a condensible fraction known as pyrolytic gasoline. That pyrolytic gasoline is rich in unsaturated and aromatic hydrocarbons and serves as a starting material for the recovery of aromatic compounds of very high purity, particularly of benzene, toluene, xylene, styrene and the like. A considerable portion of pyrolytic gasoline, about 20% by weight thereof, consists of a fraction of $C_5$ hydrocarbons boiling approximately in the range of 25–50° C.

The $C_5$ fraction of pyrolytic gasoline contains isoprene and cyclopentadiene in larger amounts than the remaining $C_5$ hydrocarbons.

Isoprene is highly desired as a raw, basic starting material for use in the production of synthetic rubber. For this reason it has often been attempted to separate it from $C_5$ fractions. The preferred method comprises an extractive distillation using a selective solvent. In that method, isoprene must be separated from the paraffins and monoolefins, which are less soluble in the selective solvent, as well as from cyclopentadiene, which is more soluble.

The separation of isoprene from the more soluble cyclopentadiene is difficult and is rendered complicated by the fact that the cyclopentadiene partly dimerizes and as the dimer cannot be separated from the solvent, the dicyclopentadiene will split up once more into the monomer so that cyclopentadiene remains in the isoprene.

SUMMARY

It has been found that this difficulty can be avoided if isoprene and cyclopentadiene are separated by a countercurrent extraction process using a pure solvent after the paraffins and monoolefins have been separated from the mixed $C_5$ hydrocarbon feedstocks and the remaining diolefins mixture has been subjected to an extractive distillation to enrich the isoprene.

The process comprises two successive process stages, each of which includes a countercurrent extraction and an extractive distillation and which are carried out in such a succession that the two extractive-distillation steps directly succeed each other whereas the initial and final steps consist of countercurrent extraction steps. The same solvent is used in all extraction steps and may be a single substance or a mixture of substances. The individual substance or the mixture of substances may contain water. The water contents may differ between one step and another.

THE DRAWINGS

FIG. 1 is a flow diagram illustrating the process of the present invention; and

FIGS. 2 and 3 are flow diagrams illustrating alternate embodiments of the process of the present invention.

In the drawings, like reference numerals are used to identify like components.

DESCRIPTION

The present invention relates to a process of separating mixed $C_5$ hydrocarbons by extraction and extractive distillation with a selective solvent.

The process according to the invention is characterized in that the mixed feedstocks are extracted by the solvent in a first extraction step, an overhead fraction is separated from the extract-laden solvent in a first extractive distillation step and recycled to the first extraction step, paraffins and monoolefins are withdrawn as a refined product from the first extraction step, the isoprene is removed by distillation as an overhead product from the bottoms obtained in the first extractive distillation step and is separated from the cyclopentadiene and recovered as a refined product in a succeeding second countercurrent extraction step using the solvent, the extract-laden solvent of the second countercurrent extraction step is fed as an extracting agent at the top of the column for the second extractive distillation step, and the bottoms obtained in the second extractive distillation step are separated by distillation into cyclopentadiene and solvent.

Suitable solvents are, e.g., acetonitrile, N-dimethylacetamide, monoethanolamine, ethylene diamine, dimethylformamide, butyrolactone, furfural, morpholine, aniline, N-methylpyrrolidone, glycol-methyl ether, and mixtures of two or more of the foregoing. Water may be present in the solvent or solvent mixtures.

The solvent used in the second countercurrent extraction step to refine the isoprene should be free of cyclopentadiene and its dimers and may be recovered by distillation from the bottoms obtained in the cyclopentadiene distillation step if the solvent has a much lower boiling point than cyclopentadiene and if the dimer does not revert to the monomer in the distillation step.

Where high-boiling solvents are employed, the solvent for refining the isoprene in the second countercurrent extraction step may be recovered as sump-products (bottoms) in the first extractive distillation step. For this purpose, the diolefins contained in the sump-products are removed therefrom in the form of a vaporous side fraction obtained in the first extractive distillation step and are fed to the second extractive distillation step on an intermediate level. The sump-products obtained in the cyclopentadiene distillation step may still contain the cyclopentadiene dimer and are used in the first countercurrent extraction step as an extracting solvent, to which pure solvent from the sump-products obtained in the first extractive distillation step may be added to provide the required amount of solvent.

In the process according to the invention, two mixed feedstocks which differ highly in polarity are extracted with one and the same solvent.

The solvent is circulated through both counterflow extraction units and both extractive distillation units. The mixed feedstocks for the first countercurrent extraction step comprise paraffins, olefins and diolefins. The mixed feedstocks for the second countercurrent extraction step consist of diolefins, which are much more polar.

If a solvent is used which is sufficiently polar to effect a phase separation in the second counterflow extraction step in a mixture with the diolefins, its capacity will be insufficient in the first countercurrent extraction step so that a large amount of solvent must be kept in circulation.

If a solvent is used which approximately meets the requirements of the first countercurrent extraction step as to selectivity, capacity and polarity, it may fail to effect a phase separation in the second counterflow extraction step.

The properties of the solvent and the properties of the mixed feedstocks for the two countercurrent extraction steps are matched for optimum results in all steps of the invention.

A paraffinic solvent may be used in the second counterflow extraction step, provided that the boiling point of the countersolvent differs so much from the boiling range of the diolefins that it may be separated by distillation. This step improves the selectivity of the solvent in the second counterflow extraction step and requires additional distillation equipment.

Another alternative is to carry out the second counterflow extraction step at a lower temperature than the first step. If the first counterflow extraction step is carried out at about 50° C. and the second at about 0° C., a phase separation may be effected in the latter even if solvents having a mean polarity are used. In this case, the cost of equipment is increased because the first countercurrent extraction step may have to be carried out under superatmospheric pressure and because refrigerators and heat exchangers are required for the second counterflow extraction step.

A third alternative is to use a solvent which contains water. In both extractive distillation steps and in the cyclopentadiene distillation step, water contained in the solvent is evaporated in an azeotropic mixture with the hydrocarbons and separates in the receivers to form a heavy layer. The amounts of water which are collected in the receivers are combined and are admixed to the solvent which is supplied to the second countercurrent extraction step. As a result of this step, the solvent will have a higher polarity and water content in this step than in the other steps.

DESCRIPTION OF THE DRAWINGS

FIGS. 1 to 3 show by way of example the flow schemes of different embodiments of the invention. The essential units represented in the flow schemes are identical and designated with the same reference numbers. The process according to the invention may be carried out under normal (atmospheric) pressure or a superatmospheric pressure may be used in one, two or all steps. The two countercurrent extraction steps may be carried out at different temperatures. The means which are required for an operation under superatmospheric pressure and at a reduced temperature are well known as are suitable pumps and valves which are not shown.

The units involved are basically a first counterflow extractor 2, a first extractive distillation unit 6, a second extractive distillation unit 9, a second counterflow extractor 11 and a distillation column 16 for regenerating the solvent and distilling the cyclopentadiene. There are also heat exchangers 5 and 14 and condensers 25 and 26 for the overhead products discharged from the extractive distillation units 6 and 9.

Mixed feedstocks are supplied to the first countercurrent extractor 2 through a conduit 1. Solvent from the distillation column 16 is fed to extractor 2 through conduits 19 and 21. A refined product consisting of paraffins and monoolefins is withdrawn from extractor 2 through conduit 3. The solvent which is laden with the extract, consisting of diolefins and a small amount of monoolefins and paraffins, is fed through conduit 4 and heat exchanger 5 to the first extractive distillation column 6 in which all hydrocarbons other than diolefins (remaining small amount of paraffins and monoolefins) pass overhead and are refluxed through conduit 7 to extractor 2. The reflux recirculated through 7 to extractor 2 may contain some diolefins.

The bottom product from the first extractive distillation unit 6 is a mixture of diolefins and is fed through conduit 8 to the second extractive distillation column 9, where isoprene (and at times small amounts of pentadiene-1,3 and cyclopentene) and a portion of the cyclopentadiene present are passed overhead. This overhead product is supplied through conduit 10 to the second countercurrent extractor 11, in which the isoprene is subjected to solvent extraction to remove the co-distilled cyclopentadiene. Refined isoprene is removed from the second countercurrent extraction unit 11 through conduit 12 and may be further refined by distillation to remove any pentadiene-1,3 and cyclopentene present, if this is desired. From the second countercurrent extractor 11, solvent laden with cyclopentadiene extract is returned through conduit 13 and a heat exchanger 14 to the second extractive distillation unit 9. The solvent at the bottom of the second extractive distillation unit 9 contains cyclopentadiene. This mixture is fed through conduit 15 and the heat exchanger 14 to the distillation column 16, where it is separated. Cyclopentadiene is obtained as an overhead product in conduit 17. Part of that cyclopentadiene is refluxed through conduit 18 to column 16. Regenerated solvent is withdrawn from the bottom of column 16 through conduit 19 and is supplied partly through conduit 20 to extractor 11 and partly through conduit 21 and heat exchanger 5 to extractor 2.

Depending on the selectivity and the physical properties, particularly the boiling temperature of the selective solvent or the mixed selective solvents which is or are employed, the process which has been described may be modified in some respects to ensure that a sufficient separation of phases is effected in the second extraction step and particularly that the solvent which enters the second counterflow extractor 11 through conduit 20 is free of cyclopentadiene and its oligomers.

The invention will be explained more fully in the following examples.

Example 1

In the process according to the invention as exemplified in FIG. 1, dimethylformamide (DMF) is used as a solvent in processing the $C_5$ fraction of a pyrolytic gasoline, which fraction has the boiling range of 25–50° C. and contains 70% by weight of paraffins and monoolefins, 15% by weight of isoprene, 10% by weight of cyclopentadiene and 5% by weight of pentadiene-1,3.

The mixed feedstocks consisting of that $C_5$ fraction are supplied to the first countercurrent extractor 2 through conduit 1 at a rate of 7800 kilograms per hour. Solvent recovered in the cyclopentadiene distillation unit is supplied through conduit 21 at a rate of 28,000 kilograms per hour.

An extract-solvent mixture at a rate of 40,300 kilograms per hour is withdrawn from extractor 2 through conduit 4 and supplied to the top of the first extractive distillation unit 6.

The extractive distillation results in a hydrocarbon overhead product at a rate of 10,000 kilograms per hour. That product is refluxed through conduit 7 to the first countercurrent extractor. A refined product consisting of hydrocarbons at a rate of 5500 kilograms per hour is withdrawn from the first countercurrent extractor 2 through conduit 3, consisting of monoolefins and paraffins.

The bottoms of the first extractive distillation unit 6 consist of solvent at a rate of 28,000 kilograms per hour and diolefins at a rate of 2300 kilograms per hour and supplied through conduit 8 to the second extractive distillation unit 9, where an overhead product is removed which contains all isoprene which has been fed. This overhead product is obtained at a rate of 3000 kilograms per hour and contains cyclopentadiene at a rate of 30 kilograms per hour. The overhead product is condensed and is then supplied through conduit 10 to one end of the second countercurrent extraction column. The latter is supplied at the other end with solvent at a rate of 10,000 kilograms per hour. That solvent has been purified in the distillation column 16.

To ensure a fast and complete phase separation in all stages of that extractor, a countersolvent, in the present case heptane at a rate of 3000 kilograms per hour, is supplied in known manner through a conduit, not shown, together with the hydrocarbons supplied through conduit 10 or into the same extraction stage. The second countercurrent extractor 11 produces a refined product, which consists of heptane at a rate of 2500 kilograms per hour and isoprene at a rate of 1500 kilograms per hour and which is separated in a distillation unit (not shown).

A mixture consisting of solvent at a rate of 10,000 kilograms per hour, cyclopentadiene at a rate of 30 kilograms per hour, is present at a rate of 1470 kilograms per hour and heptane at a rate of 500 kilograms per hour is withdrawn through conduit 13 from the extract end of the second countercurrent extractor 11 and is supplied to the top of the second extractive distillation unit, which produces sump-products at a rate of 39,000 kilograms per hour. These bottoms are separated in the distillation column 16 and a side column (not shown) into solvent at a rate of 38,000 kilograms per hour, cyclopentadiene at a rate of 800 kilograms per hour and heptane at a rate of 500 kilograms per hour. The solvent is recirculated to the counterflow extraction units. The heptane is combined with the countersolvent recovered from the refined product of the second counterflow extraction unit and is reused.

Example 2

The process described in Example 1 may be carried out without a countersolvent if the second counterflow extractor 11 is operated at such a low temperature that a sufficiently rapid and efficient separation of phases is obtained in all extraction steps of said column. Additionally, the first countercurrent extractor may be operated at a higher temperature to improve the capacity of the solvent and to increase the ratio of mixed feedstocks to solvent.

For instance, the first countercurrent extractor 2 is operated at +50° C. and the second at 0° C.

In this case, mixed feedstocks (the same as in Example 1) at a rate of 7800 kilograms per hour and a solvent consisting of dimethylformamide containing 2% water, at a rate of 35,000 kilograms per hour, are supplied to the first countercurrent extractor.

The stream of the regenerated solvent in conduit 19 is divided so that 6000 kilograms thereof are supplied per hour to the second countercurrent extractor.

The heat exchangers, coolers and refrigerators required to maintain the low temperature in the second countercurrent extraction unit are not shown in FIG. 1.

Example 3 (with reference to FIG. 2)

Acetonitrile which contains 2–10% by weight of water is used as a selective solvent. To meet the requirement that the solvent supplied to the second countercurrent extractor 11 should be free of dicyclopentadiene, conduit 19 leads to a column 22 for the distillation of regenerated solvent. The distillate of column 22 contains no dimers and is supplied through conduit 20 to extractor 11. The sump-products of column 22 may still contain dimers and are supplied through column 21 to the extractor 2.

The process is carried out as follows:

The $C_5$ cut of a pyrolytic gasoline has a boiling range of 25–50° C. and contains 70% by weight of paraffins and monoolefins, 15% isoprene, 10% cyclopentadiene and 5% pentadiene-1,3. That cut is supplied at a rate of 7800 kilograms per hour through conduit 1 approximately to the middle stage of the first countercurrent extractor 2, which is a mixer-settler battery having 24 stages. The extractor 2 is fed through conduit 21 with solvent at a rate of 28,700 kilograms per hour (acetonitrile containing 2–10% by weight of water). A mixture consisting substantially of paraffins and monoolefins is withdrawn from extractor 2 through conduit 3 at a rate of 5500 kilograms per hour. A mixture consisting of 71% solvent and 29% hydrocarbons (mainly diolefins) is withdrawn from the extractor 2 at the other end thereof at a rate of 41,000 kilograms per hour through conduit 4 and is heated with hot solvent in the heat exchanger 5 and then supplied to the uppermost plate of the first extractive distillation unit 6, which is operated as a conventional extractive distillation column. The distillation column 6 has fifty actual plates and is operated under normal pressure. Its reboiler supplies so much heat that hydrocarbon vapors at a rate of 10,000 kilograms per hour are passed overhead. They are condensed in a condenser 25 and in a separator 25a are separated from entrained water (200 kilograms per hour) and are then returned as extract reflux through conduit 7 to the first countercurrent extraction unit 2. The sump-products of the extractive distillation unit 6 contain only solvent and diolefins. They flow through conduit 8 at a rate of 31,000 kilograms per hour to the thirtieth bottom of the extractive distillation unit 9. Distillation column 9 has fifty actual plates and is operated under normal pressure. It is supplied at its uppermost or fiftieth plate through conduit 13 with a mixture of 75% solvent and water and 25% diolefins at a rate of 7500 kilograms per hour. These diolefins have been removed from the extract end of the succeeding second countercurrent extraction unit.

As a result of the extractive distillation in column 9, only small amounts of cyclopentadiene enter the overhead product. The condensed overhead product consists of diolefins, mainly isoprene, at a rate of 3500 kilograms per hour, and water at a rate of 70 kilograms per hour. The diolefins are separated from the water and are supplied through conduit 10 to the second countercurrent extractor 11. The extractor 11 is a mixer-settler battery, which comprises 20 stages, in which even the last traces of cyclopentadiene are removed from the diolefins in a process in which pure selective solvent consisting of acetonitrile at a rate of 5500 kilograms per hour and water (420 kilograms per hour) removed from the distillates of columns 2, 9 and 16 are supplied through conduit 20. Isoprene at a rate of 1100 kilograms per hour and pentadiene-1,3 at a rate of 400 kilograms per hour are withdrawn from extractor 11 through conduit 12 and may be separated in a separate distillation column (not shown). The bottoms of the distillation column 9 contain solvent as well as 2.2% cyclopentadiene and some water and flow through conduit 15 at a rate of 35,000 kilograms per hour to the 35th plate of the distillation column 16. The distillation column 16 has 50 actual plates and operates under normal pressure or under a pressure of up to 10 kilograms per square centimeter absolute pressure. So much heat is generated in the reboiler of the distillation column 16 that cyclopentadiene vapor at a rate of 8000 kilograms per hour leaves the column as an overhead product, together with water at a rate of 150 kilograms per hour. When these vapors have been condensed and the water has been separated, cyclopentadiene at a rate of 800 kilograms per hour is withdrawn from the plant through conduit 17. The remaining cyclopentadiene is supplied at a rate of 7200 kilograms per hour through conduit 18 as a reflux to the column. Solvent at a rate of 34,200 kilograms per hour is withdrawn from column 16 as sump-products through conduit 19 and supplied to the fifth plate of distillation column 22. The distillation column 22 has twenty actual plates and can operate under normal pressure or under a slightly subatmospheric pressure. The reboiler supplies so much heat to the column 22 that solvent vapor at a rate of about 10,000 kilograms per hour passes overhead. Condensed solvent at a rate of 5500 kilograms per hour is supplied through conduit 20 to the extractor 11. The remainder flows through conduit 23 as reflux to the column 22. Solvent at a rate of about 28,700 kilograms per hour is withdrawn from the sump-product of column 22 and supplied through conduit 21 and heat exchanger 5 to the extractor 2. The cyclopentadiene oligomers contained in that solvent are removed in extractor 2 and leave the plant together with the paraffins and monoolefins. Because the second countercurrent extractor 11 is supplied through conduit 20 with pure solvent as well as with the water which has been removed from the distillates of columns 2, 9, 16, the solvent used in the extractor 11 contains more water so that it is more selective. The solvent used in the extractor 11 contains 10% by weight of water and the solvent used in the first countercurrent extractor 2 (conduit 21) contains only 2% by weight of water.

Example 4 (FIG. 3)

The selective solvent consists of N-methylpyrrolidone, which contains 5–15% by weight of water. To meet the requirement for a dicyclopentadiene-free solvent supplied to the second counterflow extractor 11, the diolefin vapor is withdrawn as a side stream through the conduit 24 from the first extractive distillation and supplied to the second extractive distillation unit 9 at a middle plate. The bottoms of the distillation column 6 then consist of a solvent which is free of cyclopentadiene and its dimers. Part of said solvent is supplied as pure solvent to the second countercurrent extractor 11. The solvent which is removed as sump-products from column 16 contains cyclopentadiene oligomers, which are removed in extractor 2 and leave the plant together with the paraffins and monoolefins.

The process is carried out as follows:

The $C_5$-cut of a pyrolytic gasoline has a boiling range of 25–50° C. and contains 70% by weight of paraffins and monoolefins, 18% isoprene, 10% cyclopentadiene and 2% pentadiene-1,3. This cut is supplied at a rate of 7800 kilograms per hour through conduit 1 to the middle plate of extractor 2, which consists of a mixer-settler battery comprising 24 stages. Solvent consisting of N-methylpyrrolidone, which contains 5% water, is supplied to the extractor 2 through conduit 21 at a rate of 41,000 kilograms per hour. Mixed refined products consisting substantially of paraffins and monoolefins leave the extractor 2 through conduit 3 at a rate of 5500 kilograms per hour. A mixture consisting of 77% solvent and 23% hydrocarbons (mainly diolefins) is withdrawn from the extract end of the extractor 2 through conduit 4 at a rate of 53,300 kilograms per hour and is heated with hot solvent in the heat exchanger 5 and supplied to the uppermost plate of the first extractive distillation unit 6. The distillation column 6 has 50 actual plates and is operated under a slightly superatmospheric pressure of about 1 kilogram per square centimeter above atmospheric pressure. At its 30th plate, the column 6 has a side outlet, through which diolefin vapors are withdrawn at a rate of 2300 kilograms per hour through conduit 24. So much heat is supplied in the reboiler of the distillation column 6 that hydrocarbon vapors at a rate of 10,000 kilograms per hour are passed overhead in addition to the hyrocarbon vapors at a rate of 2300 kilograms per hour discharged at the 30th plate. The overhead fraction is condensed in a condensing system 26 and is separated into hydrocarbon and water phases. The hydrocarbons are returned through conduit 7 to the extraction unit 2. The water (300 kilograms per hour) is added to the pure solvent entering the second countercurrent extractor 11. The dump-products of column 6 contain only pure solvent and some water and are discharged at a rate of 41,000 kilograms per hour through conduit 8. Of these sump-products, a branch stream of 7200 kilograms per hour flows through conduit 20 and heat exchanger 14 to the second countercurrent extractor 11. Diolefins at a rate of 2300 kilograms per hour flow from conduit 24 to the 30th plate of the distillation column 9. The distillation column 9 comprises 50 actual plates and is operated under normal pressure. It is supplied at its 50th plate through conduit 13 at a rate of 9700 kilograms per hour with a mixture of 74% solvent (containing water at a rate of 1000 kilograms per hour) and 26% diolefins. As a result of the treatment in the second extractive distillation unit 9, only small amounts of cyclopentadiene pass overhead with the distillate. The overhead product contains also water and is condensed and subsequently separated into an aqueous phase (100 kilograms per hour) and hydrocarbons at a rate of 4000 kilograms per hour. The hydrocarbons are supplied through conduit 10 to the second countercurrent extractor 11. The latter is a mixer-settler battery, which comprises 20 stages and in which even the last traces of cyclopentadiene are removed from the diolefins in a process in which cyclopentadiene-free solvent (N-methylpyrrolidone containing 5% water) at a rate of 7200 kilograms per hour and the water removed from the distillates of columns 6, 9, and 16 at a total rate of 700 kilograms per hour are supplied through conduit 20. Isoprene at a rate of 1350 kilograms per hour and pentadiene-1,3 at a rate of 150 kilograms per hour leave the extractor 11 through conduit 12 and may be separated in a separate distillation column, which is not shown.

A mixture of solvent and diolefins is withdrawn at a rate of 9700 kilograms per hour from the extract end of the extractor 11 and is supplied through conduit 13 and the heat exchanger 14 to the distillation column 9. The sump-products of the distillation column 9 contain solvent, water and 10% cyclopentadiene and flow through conduit 15 at a rate of 8000 kilograms per hour to the 15th plate of the stripper (column) 16. The same has 30 actual plates and is operated under a pressure of 1 kilogram per square centimeter absolute pressure. So much heat is supplied in the reboiler of the distillation column 16 that cyclopentadiene vapor at a rate of 3000 kilograms per hour passes from the column as overhead product, together with water vapor at a rate of 300 kilograms per hour. From the condensed vapors, cyclopentadiene at a rate of 800 kilograms per hour and the water are removed from the plant through conduit 17 whereas the remaining cyclopentadiene at a rate of 2200 kilograms per hour is refluxed to the column through conduit 18. Solvent at a rate of 7200 kilograms per hour is withdrawn from the sump-product of column 16 through conduit 19 and combined with solvent supplied at a rate of 33,800 kilograms per hour from conduit 8. The combined solvents contain 5% by weight of water and flow at a rate of 41,000 kilograms per hour through conduit 21 and heat exchanger 5 to the extractor 2.

Because the water which has been separated from the distillates produced in the process is supplied through conduit 20 to the second countercurrent extractor 11 together with the pure solvent which is free of cyclopentadiene, the solvent used in that step contains more water so that it is more selective. The various steps of the process contain solvents differing in water content, which amounts to 5% by weight in the first countercurrent extractor 1 and to 15% by weight in the second countercurrent extractor 11.

What is claimed is:

1. Process for separating a mixture of $C_5$ hydrocarbons containing paraffins, monoolefins, isoprene and cyclopentadiene which comprises:
   (a) extracting said mixture with a solvent and removing said paraffins and monoolefins as a refined product and leaving an extract-solvent mixture;
   (b) extractively distilling said extract-solvent mixture from step (a) and recycling the distillate to step (a);
   (c) extractively distilling the bottoms product from step (b) and recovering a mixture of said isoprene and cyclopentadiene as the distillate;
   (d) extracting the isoprene-cyclopentadiene distillate from step (c) with said solvent to remove the cyclopentadiene and recovering isoprene;
   (e) recycling the cyclopentadiene-solvent mixture from step (d) to extractive distillation step (c); and
   (f) distilling the bottoms product from step (c) and recovering cyclopentadiene as the distillate and said solvent as the bottoms product.

2. Process of claim 1 wherein steps (a) and (d) are countercurrent extractions.

3. Process of claim 1 wherein a first portion of the solvent recovered in step (f) is recycled to step (a) and the remaining portion is recycled to step (d).

4. Process of claim 3 wherein said remaining portion of solvent is distilled prior to being recycled to step (d).

5. Process of claim 1 wherein a side fraction is removed from step (d) and fed to step (c) and a portion of the bottoms from step (b) is fed to step (d) as the extracting solvent and the remaining portion is combined with the solvent from step (f) and the resulting mixture is recycled to step (a) as the extracting solvent.

6. Process of claim 1 wherein a counter-solvent is fed to step (d).

7. Process of claim 1 wherein step (d) is carried out at a temperature lower than the temperature of step (a).

8. Process of claim 1 wherein said solvent contains water.

9. Process of claim 1 wherein steps (a)–(f) are carried out at atmospheric pressure.

10. Process of claim 1 wherein steps (a), (b), (d) and (e) are carried out at superatmospheric pressure.

11. Process of claim 1 wherein said solvent is selected from the group of acetonitrile, N-dimethylacetamide, monoethanolamine, ethylene diamine, dimethylformamide, butyrolactone, furfural, morpholine, aniline, N-methylpyrrolidone, glycol-methyl ether, and mixtures of the foregoing.

12. Apparatus for separating a mixture of $C_5$ hydrocarbons containing paraffins, monoolefins, isoprene and cyclopentadiene which comprises:
   (a) means for extracting said mixture with a solvent and for removing said paraffins and monoolefins as a refined product and leaving an extract-solvent mixture;
   (b) means for extractively distilling said extract-solvent mixture from (a) and for recycling the distillate to (a);
   (c) means for extractively distilling the bottoms product from (b) and for recovering a mixture of said isoprene and cyclopentadiene as the distillate;
   (d) means for extracting the distillate from (c) with said solvent and for removing cyclopentadiene and for recovering isoprene;
   (e) means for recycling the cyclopentadiene-solvent mixture from (d) to (c); and
   (f) means for distilling the bottoms product from (c) and for recovering cyclopentadiene as the distillate and said solvent as the bottoms product.

13. Apparatus of claim 12 wherein means are provided for recycling a first portion of the solvent recovered by (f) to (a) and for recycling the remaining portion to (d).

14. Apparatus of claim 13 wherein means are provided to distill said remaining portion of solvent prior to being recycled.

References Cited
UNITED STATES PATENTS

| | | | |
|---|---|---|---|
| 2,925,452 | 2/1960 | Broughton | 203—46 |
| 2,982,795 | 5/1961 | Owen | 260—681.5 |
| 3,038,016 | 6/1962 | Hachmuth | 260—681.5 |
| 3,050,448 | 8/1962 | Fenske | 260—681.5 |
| 3,344,198 | 9/1967 | Weitz | 260—681.5 |

WILBUR L. BASCOMB, JR., Primary Examiner

U.S. Cl. X.R.

203—45, 46, 58, 59, 60, 64, 84; 260—681.5 R